(12) United States Patent
Amoroso et al.

(10) Patent No.: US 8,935,190 B2
(45) Date of Patent: Jan. 13, 2015

(54) E-MAIL HANDLING SYSTEM AND METHOD

(75) Inventors: Edward G. Amoroso, Andover, NJ (US); Ari Craine, Marietta, GA (US); Sanjay Macwan, Marlboro, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 948 days.

(21) Appl. No.: 12/333,693

(22) Filed: Dec. 12, 2008

(65) Prior Publication Data
US 2010/0153325 A1 Jun. 17, 2010

(51) Int. Cl.
G06F 17/00 (2006.01)
G06N 5/02 (2006.01)
G06Q 10/10 (2012.01)

(52) U.S. Cl.
CPC .................................. *G06Q 10/107* (2013.01)
USPC ........................................................ 706/46

(58) Field of Classification Search
CPC ...................................................... G06N 5/003
USPC ............................................................ 706/46
See application file for complete search history.

(56) References Cited

U.S. PATENT DOCUMENTS

| | | |
|---|---|---|
| 5,283,856 A | 2/1994 | Gross et al. |
| 5,377,354 A | 12/1994 | Scannell et al. |
| 5,899,995 A | 5/1999 | Millier et al. |
| 5,948,058 A | 9/1999 | Kudoh et al. |
| 6,018,342 A | 1/2000 | Bristor |
| 6,088,696 A | 7/2000 | Moon et al. |
| 6,182,118 B1 | 1/2001 | Finney et al. |
| 6,370,526 B1 * | 4/2002 | Agrawal et al. ....................... 1/1 |
| 6,496,853 B1 | 12/2002 | Klein |
| 7,054,906 B2 | 5/2006 | Levosky |

(Continued)

OTHER PUBLICATIONS

Lim et al., A Fuzzy Approach for Detecting Anomalous Behaviour in E-mail Traffic, Jan. 2007, University of Tasmania Australia, Template for SCISSEC Conferences, p. 1-16.*

(Continued)

*Primary Examiner* — Kakali Chaki
*Assistant Examiner* — Peter Coughlan
(74) *Attorney, Agent, or Firm* — Amin, Turocy & Watson, LLP

(57) ABSTRACT

A message processing system and method that recommends actions for incoming messages based upon past historical email behavior information. The historical email behavior information represents a user's behavior for a plurality of past messages and an action is recommended based on a comparison of the incoming messages to the historical email behavior information.

20 Claims, 3 Drawing Sheets

(56) References Cited

U.S. PATENT DOCUMENTS

| | | | |
|---|---|---|---|
| 7,257,564 B2* | 8/2007 | Loughmiller et al. | 706/16 |
| 7,617,285 B1* | 11/2009 | Hartmann | 709/206 |
| 7,693,945 B1* | 4/2010 | Dulitz et al. | 709/206 |
| 2002/0120619 A1* | 8/2002 | Marso et al. | 707/3 |
| 2003/0204569 A1* | 10/2003 | Andrews et al. | 709/206 |
| 2003/0231207 A1* | 12/2003 | Huang | 345/752 |
| 2005/0091319 A1 | 4/2005 | Kirsch | |
| 2005/0144162 A1 | 6/2005 | Liang | |
| 2005/0222933 A1* | 10/2005 | Wesby | 705/36 |
| 2005/0228774 A1 | 10/2005 | Ronnewinkel | |
| 2005/0246686 A1* | 11/2005 | Seshadri et al. | 717/117 |
| 2006/0165289 A1* | 7/2006 | Boss et al. | 382/182 |
| 2007/0005762 A1* | 1/2007 | Knox et al. | 709/224 |
| 2007/0097903 A1* | 5/2007 | Roy et al. | 370/328 |
| 2007/0101007 A1* | 5/2007 | Brown et al. | 709/228 |
| 2008/0005073 A1* | 1/2008 | Meek et al. | 707/3 |
| 2008/0126951 A1* | 5/2008 | Sood et al. | 715/752 |
| 2008/0228676 A1* | 9/2008 | Isozaki et al. | 706/12 |
| 2008/0244021 A1* | 10/2008 | Fang | 709/206 |
| 2008/0250322 A1* | 10/2008 | Szeto et al. | 715/733 |
| 2008/0256187 A1* | 10/2008 | Kay | 709/206 |

OTHER PUBLICATIONS

'Artificial intelligence: A modern approach': Russell, 2003, Prentice Hall.*

'Automatic Priority Assignment to E-mail Messages Based on Information Extraction and User's Action History': Hasegawa, 2000, LNAI, Springer-Verlag.*

'Ranking emails and web posts to relevance and user preferences': Ipcom, Jan. 2008, IBM.*

* cited by examiner

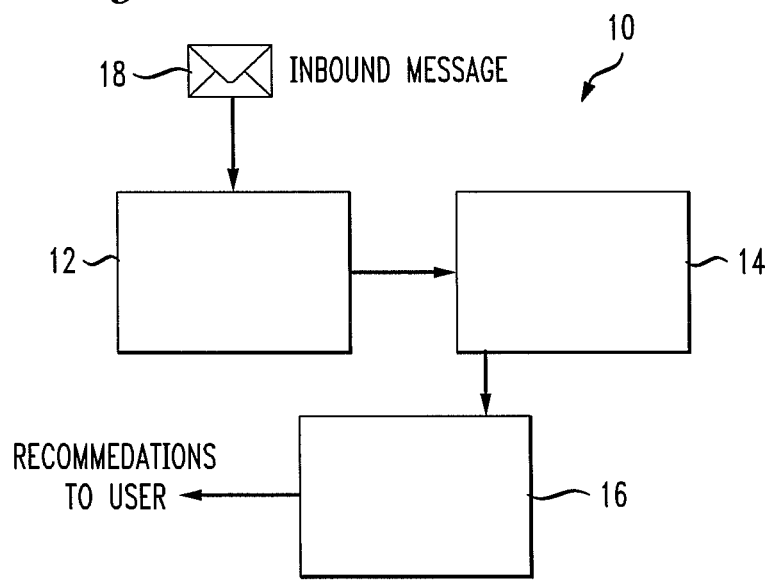
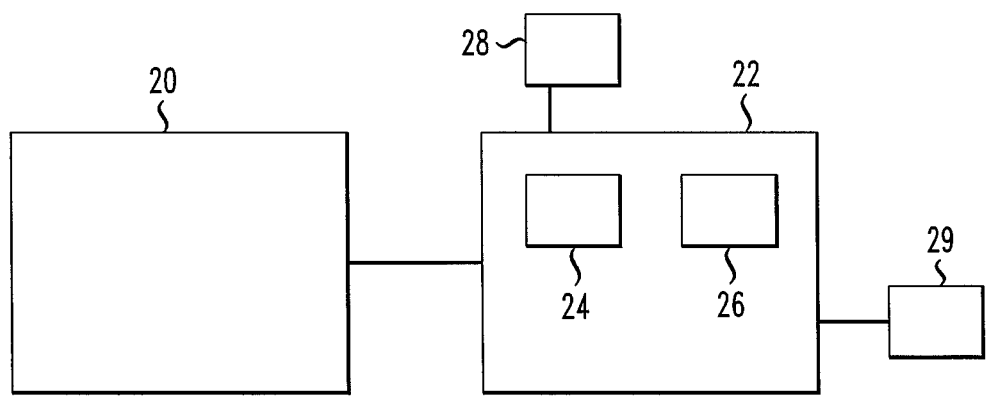

E-MAIL HANDLING SYSTEM AND METHOD

FIELD

The disclosed technology relates to a message reduction system, and more specifically, to a message reduction system that automatically recommends actions for incoming messages based upon past behavioral history.

BACKGROUND

Unified Messaging (or UM) is the integration of different forms of communication (e-mail, SMS, Fax, voice, video, etc.) into a single unified messaging system, accessible from a variety of different devices. Voicemail messages and e-mail, for example, are delivered directly into a message inbox and can be viewed side-by-side in that message inbox.

The UM system offers a powerful way to integrate information resources, especially, in a business environment. For example, you can forward a voicemail or fax to your inbox and may even be able to dictate a message into a cell phone. It is also possible for the UM system to convert voice messages into text messages.

Today, UM solutions are increasingly accepted in the corporate environment. The aim of deploying UM solutions generally is to enhance and improve business processes as well as services. UM solutions target professional end-user customers by integrating communication processes into their existing IT infrastructure, i.e., into CRM, ERP and other mail systems. However, with a combination system, such as a UM, the average user may receive an exorbitant amount of messages each day. A reasonable assumption is that most business people spend about one hour each day going through their messages. This task involves, at a minimum, skimming each message and determining whether to (i) delete, (ii) respond, (iii) save, (iv) open an attachment, (v) forward, (vi) procrastinate, or (vii) do some other thing (e.g., following a link to the Web). And if a person did not check his/her messages for a day or a week when on vacation, the number of messages could be in the hundreds or maybe even in the thousands.

Tools have been implemented that help categorize messages and increase efficiency. These tools however are extremely limiting and are based on a strict set of rules manually set by the user. Setting these rules is often a long and tedious task and many applications are riddled with technical glitches.

SUMMARY

In one embodiment, the present technology is directed towards a computing system which alleviates the inbound message problem. Specifically, the system receives inbound messages, recommends action based on past user behavior, and performs these recommended actions when authorized by the user. The system is like a personal assistant sifting through messages and determining desired action based on what the user has either done in the past or has stated as a preference.

Specifically, one embodiment of the present technology involves a messaging processing system that may include a collection and storage database and a classification system. The collection and storage database collects and stores historical email behavior information that represents past user behavior for a plurality of inbound messages. The historical email behavior information may include information related to past inbound messages and how the inbound messages were processed, handled and/or responded to. The historical email behavior information may be updated on a continuous basis.

The classification system then uses the historical email behavior information to classify incoming messages. The classification may be based on a comparison of the incoming message with the historical email behavior information, such as how similar incoming messages were handled by the user. Based on the comparison, the classification system recommends suitable actions for the incoming messages.

In order to accomplish this task, the classification system includes a processor for creating recommended actions for incoming messages. The processor may include a heuristic algorithm for comparing the incoming messages to the historical email behavior information. The classification system then uses a personal assistant client to present the recommended action to a user. The user then may confirm or reject the recommended action through the use of a confirmation component associated with the personal assistant client. If a recommended action is confirmed, a task manager may carry out the recommended action.

In another embodiment, the classification system automatically performs the actions recommended by the processor.

BRIEF DESCRIPTION OF THE DRAWINGS

FIG. 1 is a block diagram showing a first embodiment of the disclosed technology;

FIG. 2 is a block diagram showing a second embodiment of the disclosed technology;

DETAILED DESCRIPTION

Figure 3:
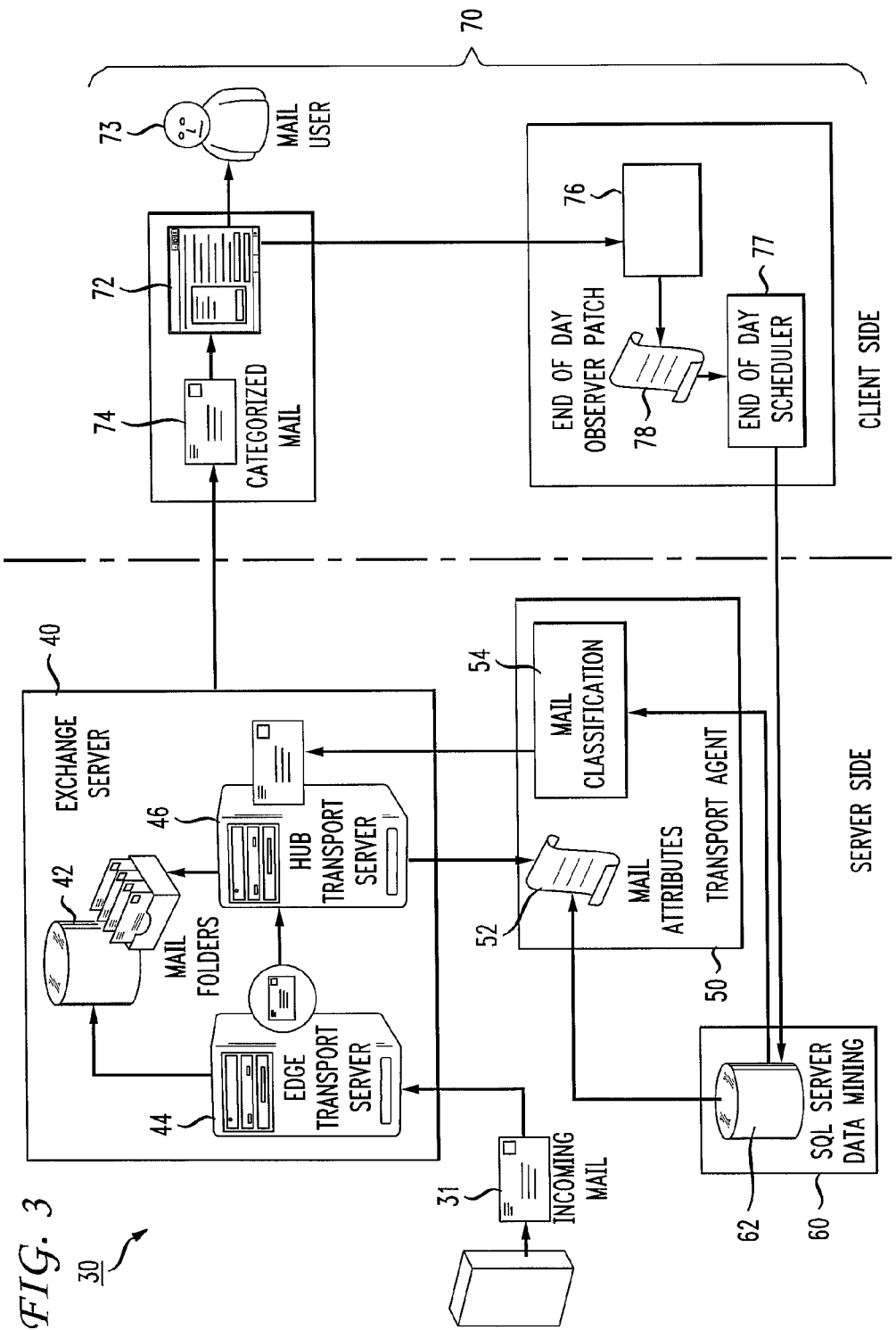
FIG. 3 is a network implementing a third embodiment of the disclosed technology.

The present technology may include a heuristic, network-based, message volume reduction tool driven primarily by a user's behavioral history. Stated more simply: the present technology watches and learns how a user processes messages and then gradually takes over the task of processing messages for the user. This system will alleviate the inbound message problem and significantly improve a user's productivity by reducing the amount of time spent daily in processing inbound messages.

FIG. 1 shows a system 10 that includes, but is not limited to, a collection and storage infrastructure 12 for storing a user's past behavioral history, a processor 14 containing a heuristic algorithm for comparing inbound messages to the user's past behavioral history and a personal assistant client 16 for recommending actions based on comparison. The personal assistant client 16 may also include a failsafe mechanism designed to ensure that the user is comfortable with all actions being taken.

In use, the collection and storage infrastructure 12 collects inbound message data from incoming messages 18. The processor 14 then compares the message data to a user's past behavioral history previously stored in the collection and storage infrastructure 12. Based on the comparison, the system 10 determines the best handling steps for the incoming message 18. The system 10 then presents these actions to the user through the personal assistant client 16. If the user wants to perform the recommended actions, the user will authorize the system to perform those actions.

The system 10 is like a personal assistant sifting through email and determining desired action based on what the user had either done in the past or stated as a preference. The system 10 may be an agent based component/software that is integrated into an existing messaging server or may be a stand alone messaging system.

The heart of the systems intelligence comes from its ability to classify messages from the knowledge of historical data and users past behavior with the messages. In an embodiment, a Naïve Bayesian classifier (Multi-variant Bernoulli Model) is chosen for the purpose of message classification. Naïve Bayesian classifiers are recognized to be among the best for classifying text due to their simplicity, efficiency and updatability but other classifiers may be used.

For best results, the system should have the ability to learn as users manually process inbound emails. Such observation is critical during an initial soak period, during which decision processing is initially shaped. The system should also have the ability to continually watch and learn manual behavior to determine changes in user behavior.

The system processing introduces the notion of messages being similar. Determination of similarity will differ as required. In particular, the following elements may be considered in the analysis of each inbound message:

Identity of Sender: This is the reported identity of the email sender. The history of how similar emails from this sender were handled will directly influence the system processing. Sender identity is one of the strongest heuristic factors in the system.

Time to Open (TTO): This is the average time taken previously by the recipient to manually process similar emails. More rapid opening in the past will lead to higher priority treatment.

Thread: This is whether a given email is part of some discussion thread. The history of how these and similar threads were handled previously will affect the system. The system processing component will collapse threads for recipients wherever possible. Such collapsing of endless threaded emails will save users considerable time.

Question Being Asked?: This is whether or not a given email is asking the recipient a question that requires an answer. Such determination requires that the system process content.

Copy-To: This considers whether an email originated as a copy to, or as a direct recipient target. Previous recipient history dealing with threads will affect the recommended action.

Spam: The system may include a back-end processing component for Spam emails that might have filtered through front-end processing.

Response Generation: This element is best explained through an example: If past outbound email from the user to some other user produces rapid, reliable, and consistent responses, then the system takes this into account. If past outbound emails from the user never seem to result in responses, then this is also considered.

Procrastination: This considers how long previous, similar emails stayed in the recipient's inbox. If every email from a given user seems to result in the recipient just procrastinating, then the system would take this into account.

Client Previewing Option: This considers the important attribute of whether the user is reading email with a preview pane open or whether decisions are being made simply based on sender, subject, and other header information. This is critical because some email that is slated as having been deleted, might actually have been read carefully.

FIG. 2 is a diagram showing a collection and storage database 20 and a classification system 22 that may be used in the disclosed technology.

The collection and storage database 20 collects and stores historical email behavior information that represents past user behavior for a plurality of inbound messages. That is, the historical email behavior information includes information related to past inbound messages and how the inbound messages were processed, handled and/or responded to. The historical email behavior information may be updated on a continuous basis.

The classification system 22 contains a processor 24 which controls the overall operation of the classification system by executing computer program instructions which define such operation. The computer program instructions may be stored in a storage device 28, or other computer readable medium 26 (e.g., magnetic disk, CD ROM, etc.), and loaded into memory when execution of the computer program instructions is desired. Thus, the steps discussed in FIG. 4 can be defined by the computer program instructions stored in the memory 26 and/or on a storage device 28 controlled by the processor 24 executing the computer program instructions. For example, the computer program instructions can be implemented as computer executable code programmed by one skilled in the art to perform the algorithm associated with the disclosed technology. Accordingly, by executing the computer program instructions, the processor 24 executes the associated algorithm.

Specifically, the classification system 22 uses the historical email behavior information to classify incoming emails by comparing the incoming email to the historical email behavior information. Based on the comparison, the classification system 22 recommends suitable actions for the incoming emails.

In order to accomplish this task, the classification system 22 first watches inbound email and gives each email some neutral urgency rating. Factors that influence this initial neutral rating include (i) history of observed user behavior, (ii) generic email processing heuristics, and (iii) explicit rules set by the user. At a high level, the classification system 22 includes three major components: (i) a learning component that watches user behavior through an initial soak period as well as beyond, (ii) an action recommendation component provided to the user, and (iii) a confirmation component where users can selectively approve or reject proposed recommended actions.

The classification system 22 may also include one or more network interfaces for communicating with other devices 29 via a network and input/output devices that enable user interaction with the classification system 22 (e.g., display, keyboard, mouse, speakers, buttons, etc.). It will be understood that FIG. 2 is a high level representation of some of the components of the classification system 22 for illustrative purposes. The details of such systems will be known to those having ordinary skill in the relevant art.

FIG. 3 is an exemplary network that implements the disclosed technology. The network 30 may include an exchange server 40, a transport agent 50, a data mining server 60 and a client-side message inbox 70.

The exchange server 40 includes a network mail folder 42, an edge transport server 44 and a hub transport server 46. The edge transport server 44 is a mail routing server that typically sits at the perimeter of a network's topology and routes mail in to and out of the organization's network. It is usually deployed in the organization's perimeter network and handles all Internet-facing mail flow, providing protection against spam and viruses.

The network mail folder 42 receives all mail from the edge transport server 44 and may store the mail in a network database (not shown) associated with the network mail folder 42.

The hub transport server 46 is a mail routing server that routes mail within the network 30 and is deployed inside a user's organization. The hub transport server 46 handles all mail flow inside the organization, applies organizational message policies, and is responsible for delivering messages to a recipient's mailbox 70. Specifically, the hub transport server 46 may: (1) process all mail that is sent inside the organization's network 30 before it is delivered to a recipient's inbox 72 inside the organization or routed to users outside the organization; (2) perform recipient resolution, routing resolution, and content conversion for all messages that move through the network transport pipeline; and (3) determine the routing path for all messages that are sent and received in the organization including the delivery of messages to a recipient's mailbox 72. (For example, messages that are sent by users in the organization are picked up from the sender's outbox by a store driver and are put in a submission queue on the hub transport server 46.)

The transport agent 50 is associated with the edge transport 44 and hub transport 46. The transport agent's fundamental importance is in message security, regulation and hygienic process of the network 30. The transport agent's architecture allows for the flow of messages that pass through a transport pipeline to be processed by the transport agent 50. The transport agent 50 also lets system administrators install custom software which can respond to specific SMTP events.

In the case of the disclosed technology, the transport agent 50 will assist in analyzing and classifying incoming messages based on historical user behavior. That is, the transport agent can extract mail attributes, using an extractor 52, from an incoming message and send these attributes to a data mining server 62. After the data mining server 62 analyzes the incoming message attributes, the server sends a mail classification attribute to the transport agent and this classification attribute is attached to the incoming message and the message is sent to the client-side message inbox 70.

The data mining server 62 may contain a collection and storage infrastructure 12 and a processor 14 as discussed in FIG. 1. The server 62 is capable of asynchronously examining the incoming messages attributes by parsing the mail attributes and predicting the classification of the message based on stored historical data.

The data mining server 62 may include a historical observation component. This component will collect and store information about an individual's messaging processing. That is, the component stores historical email behavior information representing past user behavior for a plurality of inbound messages. The collection of historical email behavior may be collected at (i) email servers, (ii) network collection points, or (iii) individual clients. Email servers are optimal in enterprise networks since relevant information resides there, but carrier-based solutions could be embedded the system into the network infrastructure. The system will often require observation of email content to make accurate predictions of desired future behavior. For example, if a user always deletes sales solicitation emails, then the system needs to review content to make this determination. If the environment prevents such content review for reasons of privacy, then the algorithm used with the system is likely to be much less useful.

The data mining server 62 may also include a classification algorithm for predictive modeling. Mail classification may be done by a naive Bayesian algorithm running inside server 62. This algorithm explores the data between input columns and predictable columns, and discovers the relationships between these columns. The algorithm then calculates the conditional probability between input and predictable columns, and assumes that the columns are independent. This assumption of independence leads to the name Naive Bayes, with the assumption often being naive in that, by making this assumption, the algorithm does not take into account dependencies that may exist.

As discussed above, based on the classification, a classification attribute in the form of an XML document is created and attached to the incoming message.

The client-side message inbox 70 receives the categorized mail 74 and reads the predicted classification attribute. That is, the inbox has a processor 76 containing a program which is capable of reading the XML document. The inbox also has a personal assistant client 72 that presents the XML document containing the recommended action to a user 73. The user 73 then may confirm or reject the recommended action through the use of a confirmation component associated with the personal assistant client 72. If a recommended action is confirmed, the processor 76 may have an associated task manager that may carry out the recommended action or the task manager may be its own network device.

The inbox 70 also has an observation program 78 which is capable of observing all actions which the user is taking with the received messages. For example, confirmation decisions by the user will be taken into account on an on-going basis. Obviously, if a user repeatedly approves or rejects some given type of recommendation, then the system must learn this and make the necessary adjustments.

Additionally, explicit static rules provided by the user about email processing may be implemented. For example, the user might decide to ensure that high priority treatment is always afforded to emails received from a boss or spouse. Similarly, users can selectively target certain vendors—perhaps the most annoying and persistent ones—to ensure the lowest priority treatment. These observations are noted and sent to the data mining server 62.

At the end of each day, an End of Day (EOD) patch in the form of a XML file may be generated based on the user's actions for that day. This file will be sent to the data mining server 62 to act as further input for server. The schedule EOD Patch job will run on every client machine. This may be a regular console application which can be scheduled using a Windows Scheduler application.

Figure 4:
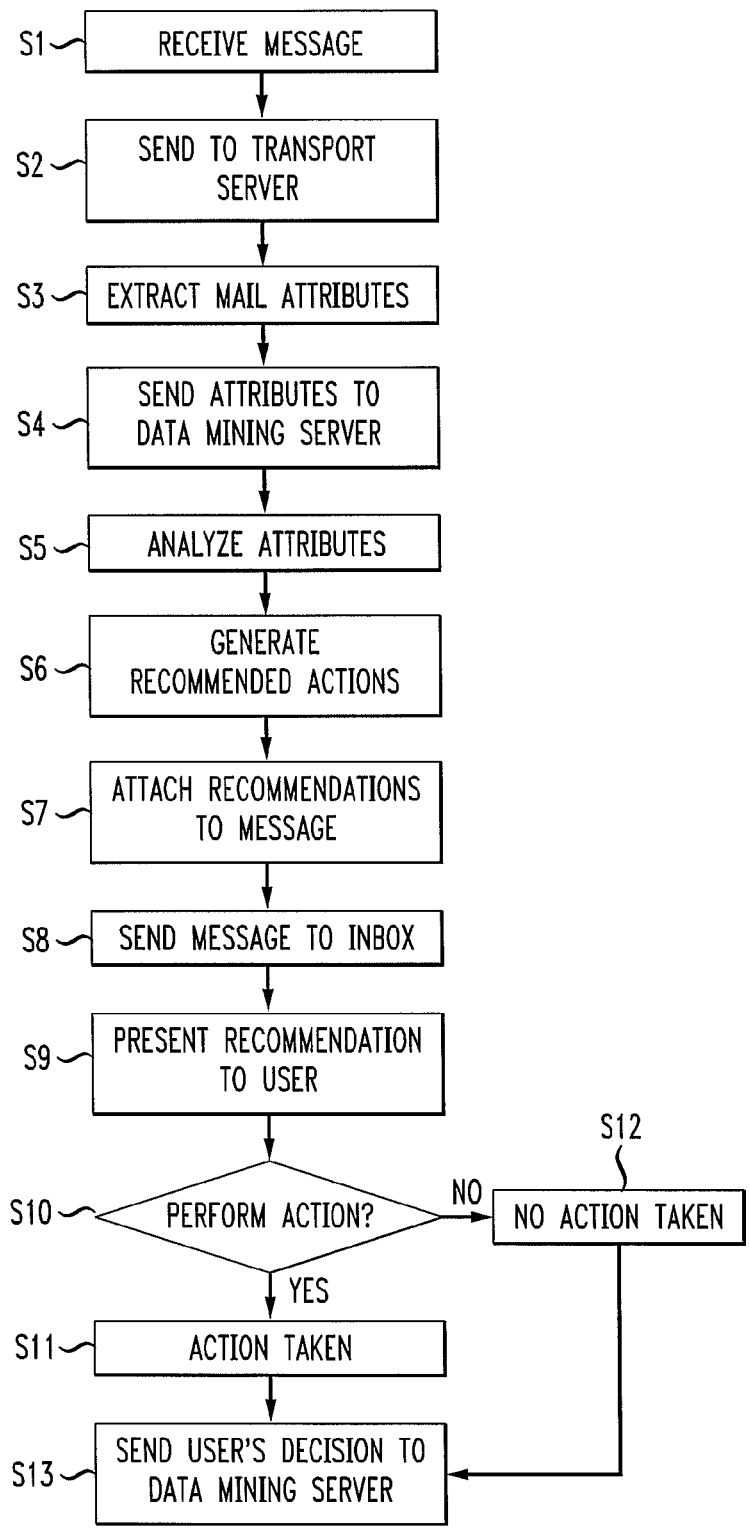
FIG. 4 is a flow diagram illustrating the network of FIG. 3.

FIG. 4 is a flow diagram relating to the method used in FIG. 3. In use, a message is received from a sender in an exchange server S1. The message is sent to a transport server S2. Mail attributes associated with the message are extracted from the message S3. The mail attributes are sent to a data mining server S4.

The mail attributes are analyzed by a data mining server S5. Specifically, the mail attributes will be parsed and a temporary table will be created out of the same. This temporary table will be used for prediction against the mining model already present in the data mining server. Recommended actions will be generated based on the analysis of the mail attributes S6. The recommended actions will be attached to the message S7. That is, the predicted classification for each mail item will be added as a custom property to each mail item. The mail classification attribute will then be added to the header of the message. The message with attached recommendation will be sent to the client-side inbox S8.

The recommended actions are the read by the inbox and presented to the user through a personal assistant client S9.

The personal assistant client may obtain its information from a separate dedicated server—most likely set up as a Web server.

The system then asks the user if the user wants to perform the recommended actions S10. If yes, the recommended actions will be performed directly on that user's in-box S11. If no, no steps will be taken S12. In either case, the system will send the user's decision to the data mining server so as to update the user's behavioral history S13.

In this embodiment, no steps will be taken without the system being explicitly notified via the personal assistant. The system architecture does leave open the future possibility of skipping user confirmation so that the automatic processing can complete without interrupting the user. This could evolve into an on-the-fly component of in-box management.

The personal assistant interacts with the user on a regular or demand basis. That is, analysis of messages may be made hourly, daily or as set be the user. Or the system may be implemented when requested by the user. For example, if a user was away on vacation and returns to numerous emails. The user may implement the program at his/her leisure and the system will give recommendations at that time.

The non-computing analogy here is that of a secretary poring manually through the boss's email, and then presenting recommended actions for approval. Design considerations here are as follows:

Routine: The personal assistant must accommodate the ability for users to regularly review confirmation requests and reports by the system. This should be done on a user demand basis, rather than through a push approach.
  Demand: Nevertheless, the personal assistant should include some sort of feature to notify the user when a supremely urgent email is received and must be handled. This could be done through some existing multimedia contact service to include phone, text, email, or messaging.
  Multimedia: Users should have the ability to fine-tune the personal assistant to include interesting features such as Avatar voice and processed video, or some other option if desired.

The specifics of the personal assistant are not critical to the system processing, but are clearly important to broad adoption.

The server portion of the personal email assistant are best handled using simple Web-based tools and interfaces. The system should write its recommendations to this dedicated Web-based reporting infrastructure, and each user's personal email assistant should be set up to authenticate to the server and to receive recommendations. Obviously, approvals would also be performed using this Web-based infrastructure.

To illustrate the system processing, let's suppose that employee Bob receives roughly 100 emails each weekday, and about 50 or so each weekend day. This brings his weekly average total to about 600. Bob has neither a secretary nor a Blackberry so he must read and review each message himself when on his computer. Bob would like to cut down the time needed to review his messages.

Bob implements the present technology which may require a designated soak period—perhaps two weeks. During this time, the system collects copies of Bob's email for processing. It watches the email coming in, watches and learns how Bob handles the mail in his inbox, and then watches any email going out. The system also reviews output requested by Bob and provides Bob an opportunity to select preferences (e.g., his boss, major groups he interacts with, things he hates to receive, and so on).

After the two weeks is over, the system has a pretty good idea of how Bob handles email, so long as no weird anomalies occur such as Bob going on vacation during the soak period. After the soak is completed, the system will begin building recommendations for Bob. Bob is encouraged to view the system's website with his personal assistant to obtain his recommended actions. The recommendations might include the following samples:

Delete Recommendations: A summary of emails for deletion, where the summary is designed specifically to be reviewed quickly as in "You received 24 ITO notifications from ito@problem.att.com—these are recommended for deletion."
  Thread Collapsing and Summary: A collapsing of all emails included in a thread along with a summary of the content and recommendations on how best to handle.
  Priority Emails: A prioritized listing of emails that would seem to require immediate response.

Bob should be able to hit a button, which would either approve or disapprove a set of recommendations. He should also have the ability to selectively agree to some portion of the recommendations. If the deletions made by Bob, including threads, are agreed to by simply hitting one button, then the time saving could be considerable. The system deletion report is also written so that one can process recommendations after a brief perusal and visual scan. Thus, in the very best possible case, the deletion option alone could result in a two-thirds reduction in email volume, thus saving the user 40 minutes each day.

The architecture of the system can be deployed within any enterprise. As the system evolves, scaling issues and extensions to mobile and/or fixed broadband consumers are considered.

The system introduces a processing component that will process copies of collected email to determine recommended actions. Both of these functions can be performed off-line on separate hardware and software so that negligible impact will be noticed on the email servers. The hardware and software must be programmable so that the custom algorithms can freely manipulate inbound email as input. If email copies are obtained using network-based sniffing then the impact for collection and processing would be essentially zero.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A system, comprising:
    a memory to store executable instructions; and
    a processor, coupled to the memory, that facilitates execution of the executable instructions to perform operations, comprising:
        determining, during a soak period, whether incoming messages of a sender that have been received at a messaging inbox of a recipient device have been reviewed with a preview pane;

in response to determining that the incoming messages of the sender have been reviewed with the preview pane, assigning a priority to the incoming messages;

in response to determining that a message that has been received at the messaging inbox satisfies a defined similarity to the incoming messages with respect to an identity of the sender, assigning the priority to the message; and sending, based on the priority, a request directed to the recipient device for approval of an action to be performed on the incoming messages.

2. The system of claim 1, wherein the operations further comprise requesting the approval of the action in response to detecting a demand for the approval.

3. The system of claim 1, wherein the operations further comprise requesting the approval of the action according to a defined schedule.

4. The system of claim 1, wherein operations further comprise updating historical information corresponding to the incoming messages based on the approval.

5. The system of claim 1, wherein the operations further comprise comparing, based on a heuristic, message information associated with the message with historical information corresponding to the incoming messages.

6. The system of claim 5, wherein the operations further comprise determining a conditional probability corresponding to the message information and the historical information.

7. The system of claim 1, wherein the operations further comprise sending instructions to perform the action to a server device in response to receiving the approval.

8. The system of claim 1, wherein the operations further comprise performing the action in response to receiving the approval, wherein the action comprises deleting the incoming messages.

9. A method, comprising:
   determining, by a system comprising a processor during a soak period, whether incoming messages corresponding to a sender identity that have been received at an inbox of a recipient device have been reviewed with a preview pane;
   in response to determining that the incoming messages have been reviewed with the preview pane, assigning, by the system, a priority to the incoming messages;
   in response to determining that a message that has been received at the inbox satisfies a defined similarity to the incoming messages with respect to the sender identity, assigning, by the system, the priority to the message; and
   requesting, by the system from the recipient device based on the priority approval of a common action to be performed on the incoming messages.

10. The method of claim 9, wherein the requesting comprises requesting the approval on a demand basis.

11. The method of claim 9, wherein the requesting comprises requesting the approval at scheduled intervals.

12. The method of claim 9, further comprising:
   comparing, by the system, historical information representing a use of inbound messages with information related to responses to the inbound messages.

13. The method of claim 9, further comprising:
   updating, by the system, historical information associated with the incoming messages based on information representing the message.

14. The method of claim 9, further comprising:
   confirming, by the system, that the common action satisfies a defined condition.

15. An apparatus, comprising:
   a memory to store executable instructions; and
   a processor, coupled to the memory, that facilitates execution of the executable instructions to perform operations, comprising:
      monitoring, during a defined process, whether messages of a sender that have been received at an inbox of a device of a recipient identity have been reviewed with a preview pane;
      in response to determining that the messages have been reviewed with the preview pane, assigning, a priority to the messages;
      receiving, via the inbox of the device, an inbound message that has been directed to the recipient identity;
      in response to determining that the inbound message satisfies a defined similarity to the messages with respect to the recipient identity, assigning the priority to the inbound message; and
      sending a communication directed to the recipient identity comprising a request for approval of an action to be performed on the messages.

16. The apparatus of claim 15, wherein the operations further comprise receiving the approval of the action.

17. The apparatus of claim 16, wherein the operations further comprise updating information regarding the messages in response to the receiving of the approval of the action.

18. The apparatus of claim 15, wherein the operations further comprise comparing historical information representing a use of the messages with information related to responses to the messages.

19. The apparatus of claim 15, wherein the operations further comprise updating historical information associated with the messages based on information representing the inbound message.

20. The apparatus of claim 15, wherein the operations further comprise deleting, based on the request, the messages.

* * * * *